(12) United States Patent
Willemin et al.

(10) Patent No.: US 9,786,959 B2
(45) Date of Patent: Oct. 10, 2017

(54) SMART BATTERY PROVIDED WITH A POWER SUPPLY VOLTAGE MANAGEMENT CIRCUIT

(71) Applicant: The Swatch Group Research and Development Ltd, Marin (CH)

(72) Inventors: Michel Willemin, Preles (CH); Marc Degrauwe, Chez-le-Bart (CH); Sergio Rota, Colombier (CH)

(73) Assignee: The Swatch Group Research and Development Ltd, Marin (CH)

( * ) Notice: Subject to any disclaimer, the term of this patent is extended or adjusted under 35 U.S.C. 154(b) by 72 days.

(21) Appl. No.: 14/460,515

(22) Filed: Aug. 15, 2014

(65) Prior Publication Data

US 2015/0072180 A1    Mar. 12, 2015

(30) Foreign Application Priority Data

Sep. 10, 2013   (EP) .................................... 13183802

(51) Int. Cl.
  *H01M 10/42* (2006.01)
  *H01M 10/48* (2006.01)
  *H02J 7/00* (2006.01)

(52) U.S. Cl.
  CPC ....... H01M 10/4257 (2013.01); H01M 10/48 (2013.01); H01M 2010/4271 (2013.01); H01M 2010/4278 (2013.01); H02J 2007/0098 (2013.01)

(58) Field of Classification Search
  CPC ............. H01M 10/4257; H01M 10/48; H01M 2010/4278; H01M 2010/4271
  USPC ............................................................ 429/7
  See application file for complete search history.

(56) References Cited

U.S. PATENT DOCUMENTS

| | | | |
|---|---|---|---|
| 5,610,450 | A | 3/1997 | Saeki et al. |
| 6,198,250 | B1 | 3/2001 | Gartstein et al. |
| 2004/0196004 | A1 | 10/2004 | Sasaki |
| 2005/0163309 | A1 | 7/2005 | Kim |

(Continued)

FOREIGN PATENT DOCUMENTS

EP    1 892 791 A1    2/2008

OTHER PUBLICATIONS

"AVR318 : Dallas 1-Wire master", 8-bit AVR 1 Microcontrollers—Application Note, Sep. 1, 2004, XP055092372, extracted from Internet: URL:http://www.atmel.conn/images/doc2579.pdf.

(Continued)

*Primary Examiner* — Nicholas P D'Aniello
(74) *Attorney, Agent, or Firm* — Sughrue Mion, PLLC

(57) ABSTRACT

The smart battery includes an electronic circuit for managing the supply voltage connected to a battery. The electronic circuit includes a battery end-of-life detector, a management unit, an oscillator stage, a DC-DC converter powered on when the supply voltage of the battery is close or equal to a battery end-of-life threshold, and a data or command communication interface. The data or command communication interface is a 1-wire interface which is connected to a positive supply voltage terminal of the smart battery for transmitting a modulated data or command signal through one of the supply voltage terminals. The modulated signal transmitted by the interface may include battery end-of-life information.

12 Claims, 1 Drawing Sheet

(56) References Cited

U.S. PATENT DOCUMENTS

2009/0039833 A1* 2/2009 Kitagawa .............. H01M 10/46
320/134
2010/0070687 A1* 3/2010 Novac .................... G04D 7/003
711/103

OTHER PUBLICATIONS

"Dallas Semiconductor. Application Note 122 : Using Dallas' 1-Wire Chips in 1-cell Li+ battery packs with low-side n-channel safety FETs", Jan. 5, 2000, pp. 1-2, XP055092608, Extracted from Internet: URL: http://www.datsi.fi.upm.es/docencia/Micro_C/dallas/app122.pdf.
Dallas Semiconductor: "DS2760 High-Precision Li+ Battery Monitor", Internet Creation, Sep. 1, 2006, pp. 1-26, XP002658011, Extracted from Internet: URL: http://datasheets.maxim-ic.com/en/ds/DS2760.pdf.
"Application Report SLVA101. HDQ Communication Basics for TI's battery Monitor ICs", May 1, 2001, pp. 1-8, XP055092630, Extracted from Internet: URL: http://www.ti.com/lit/an/slva101/slva101 .pdf.
Javier Ibanez Vial et al., "Monitoring Battery System for Electric Vehicle, Based on "One Wire" Technology", IEEE Vehicular Power Propulsion VPP-2004, Oct. 8, 2004, pp. 1-5, XP055092604.
European Search Report of EP 13 18 3802 dated Feb. 3, 2014.

* cited by examiner

SMART BATTERY PROVIDED WITH A POWER SUPPLY VOLTAGE MANAGEMENT CIRCUIT

This application claims priority from European Patent Application No. 13183802.1 filed Sep. 10, 2013, the entire disclosure of which is hereby incorporated by reference.

FIELD OF THE INVENTION

The invention concerns a smart battery, which is provided with an electronic circuit for managing the power supply voltage. The electronic circuit includes a battery end-of-life (EOL) detector, an oscillator stage, a power management unit and a communication interface. The electronic circuit may also include a DC-DC converter powered on as soon as the supply voltage is close or equal to a battery EOL threshold. This may make it possible to extend the life of the product using the battery by continuing to supply a voltage above the minimum limit, and by extracting its residual power. The maximum current supplied by the battery may also be limited by the management unit, also in order to extend its life and therefore that of the product. This battery may be a primary battery, but also a rechargeable battery.

BACKGROUND OF THE INVENTION

A cell or battery may include, in a known manner, a management circuit particularly a power management circuit, which is integrated in the structure of the cell or battery. U.S. Pat. No. 6,198,250 B1, which discloses a smart cell or battery of this type comprising a controller circuit, may be cited in this regard. The controller circuit is connected to the cell or battery supply terminals. The controller circuit makes it possible to extend the battery life. To achieve this, the controller circuit includes a DC-DC converter clocked by an oscillator to convert the cell or battery voltage into an output voltage, which may be higher than a cut-off voltage or a battery end-of-life voltage. The converter may be powered on as soon as the battery voltage reaches a battery end-of-life voltage threshold so as to extend the battery life.

In the smart cell or battery of U.S. Pat. No. 6,198,250 B1, no means is provided in the controller circuit for transmitting digital data to an electronic device powered by the smart battery. No information concerning the battery end-of-life or the type of battery used is communicated to the exterior of the smart cell or battery to ensure the proper operation of the electronic device before changing the battery, which is a drawback.

WO Patent Application No 2005/081787 A1, which discloses a battery provided with an electronic circuit may also be cited. The electronic circuit of the battery includes a non-volatile memory, a thermistor, a voltage identification unit, a switch in the form of a FET transistor in series with the thermistor, and a good battery data interface. The data interface terminal is connected to the non-volatile memory, which is connected to the terminals of the rechargeable battery. The switch is controlled by the voltage identification unit. If the battery level is low, the switch is open, which means that a measurement cannot be taken via the thermistor, but communication can be established between a charger and the battery circuit through a clock terminal in association with the memory. However, if the voltage level is sufficient, a thermistor measurement is taken by the charger to determine the temperature of the battery circuit.

Several terminals for voltage supply and data communication must be provided for the battery containing the electronic circuit in WO Patent Application No 2005/081787 A1. This therefore complicates the manufacture of said battery and does not properly optimise the power supply and provision of data towards the exterior of the battery, which is a drawback.

EP Patent Application No 1 892 791 A1 describes a battery pack, which includes a battery connected to an electronic power supply voltage management circuit. The electronic circuit includes operating state detection means for detecting a current, a voltage and a temperature. These detection means are connected to a control unit. A communication interface connected to the control unit is also provided for communicating with an electronic instrument by a modulated signal. However, the electronic circuit is not arranged to adapt certain operating parameters, which is a drawback.

SUMMARY OF THE INVENTION

It is therefore an object of the invention to provide a smart battery, which is provided with an electronic circuit for managing the supply voltage capable of communicating data to an electronic device powered by the smart battery and overcoming the aforementioned drawbacks of the state of the art.

To this end, the invention concerns a smart battery which includes an electronic supply voltage management circuit connected to a battery, the electronic circuit including a battery end-of-life detector, a management unit, an oscillator stage and a data or command communication interface, wherein the data or command communication interface is connected to one of the supply voltage terminals of the smart battery for transmitting and receiving a modulated digital data or command signal through one of the supply voltage terminals, and wherein the data or command communication interface is arranged for receiving a modulated signal from an electrical apparatus powered by the smart battery, the modulated signal received by the interface including a command to set the battery end-of-life threshold after which a DC-DC converter of the electronic circuit is powered on by the management unit to supply the supply voltage of the smart battery.

Specific embodiments of the smart battery are defined in the dependent claims 2 to 12.

One advantage of the smart battery lies in the fact that the data is communicated on the same connection wire of one of the power supply terminals of the smart battery. Preferably, data is communicated on the connection wire of the high potential terminal of the smart battery. Digital data can be transmitted on the power supply by temporal windows of different duration depending on the state of each bit to be transmitted or possibly by means of phase or frequency modulation. The modulated data to be transmitted may be a digital battery end-of-life signal.

Advantageously, a 1-wire interface, which is controlled by a management unit of the electronic power supply voltage management circuit, supplies a modulated digital data or command signal through the positive terminal of the smart battery. As the management unit is clocked by a clock signal from a clock oscillator stage, the 1-wire interface is able to supply a modulated data signal relative to a top second signal for an electric apparatus including the smart battery.

BRIEF DESCRIPTION OF THE DRAWINGS

The objects, advantages and features of the smart battery provided with an electronic power supply voltage management circuit will appear more clearly in the following description, based on a simplified non-limiting embodiment illustrated by the drawings, in which.

DETAILED DESCRIPTION OF THE INVENTION

In the following description, all those electronic components of the electronic battery circuit that are well known to those skilled in the art in this technical field will be described only in a simplified manner.

Figure 1:
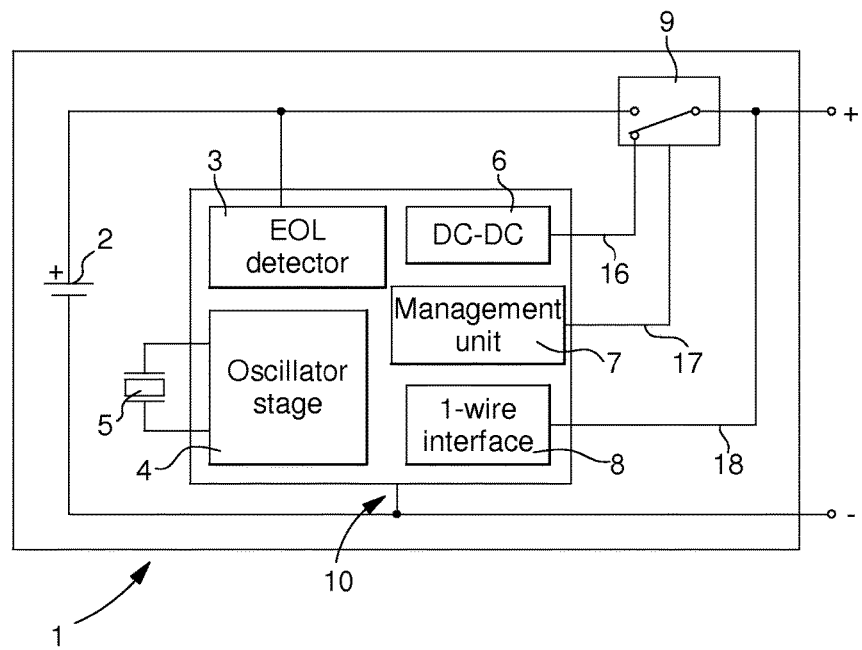
FIG. 1 shows a simplified view of the components of the smart battery provided with the electronic supply voltage management circuit according to the invention.

FIG. 1 shows a schematic general view of all the components of smart battery 1. This battery may take the form of a button battery able to be placed in a battery housing of an electrical apparatus, such as a watch, for the electrical power supply of the electronic elements of the electrical apparatus.

Smart battery 1 includes an electronic power supply voltage management circuit 10, which is connected to the two positive and negative supply terminals of battery 2. Electronic circuit 10 makes it possible first of all to control the battery discharge in an optimum manner while indicating the battery end-of-life, when the voltage of battery 2 is close to a battery end-of-life threshold. Electronic circuit 10 may be integrated in the structure of battery 2 or arranged on an external surface of the battery structure.

This electronic circuit 10 includes a battery end-of-life detector 3, designated EOL, an oscillator stage 4, whose oscillator may be connected to a conventional quartz resonator 5, a DC-DC converter 6, a management unit 7, a 1-wire interface 8 for the transmission or reception of data or command signals, and a switch 9 controlled by the management unit. Management unit 7 is also connected to battery end-of-life detector 3, to oscillator stage 4, to DC-DC converter 6 and to the 1-wire interface 8. Management unit 7 can thus control the operation of DC-DC converter 6, of 1-wire interface 8 and of switch 9 according to the voltage level of battery 2 detected by battery end-of-life detector 3.

Battery end-of-life detector 3 is connected to the positive terminal of battery 2 so as to determine the moment when the value of the voltage supplied by battery 2 reaches a determined battery end-of-life threshold. In the case of a button battery, the battery end-of-life threshold may be set for example at 1.2 Volts, but may also be set at a lower value. In order to be able to perform the battery end-of-life detection, detector 3 may include a comparator, a first input of which is connected to a reference voltage set in accordance with the defined battery end-of-life threshold, and a second input of which is connected to a node of a capacitive divider connected between the positive and negative terminals of battery 2. Once the battery voltage level is at the battery end-of-life threshold, the comparator supplies an output signal to management unit 7, which controls the powering on of DC-DC converter 6.

Switch 9 of the electronic circuit is in the form of a power supply selector. A first input of this switch 9 is preferably connected to the positive terminal of battery 2, and a second input is connected to an output of DC-DC converter 6 to receive an output voltage 16 from the converter during operation thereof. The output of switch 9 is preferably connected to an external positive terminal of electronic battery 1 to supply the voltage of battery 2 when its voltage level is above the battery end-of-life threshold detected by detector 3. However, the output of switch 9 supplies output voltage 16 from DC-DC converter 6 when the voltage level of battery 2 is equal to or below the battery end-of-life. In this case, management unit 7 supplies a command signal 17 to switch 9 to connect the output of the DC-DC converter to the external positive terminal of smart battery 1. Thus, the battery end-of-life duration can be extended by powering on DC-DC converter 6 which is preferably a Boost converter. This Boost converter can boost the voltage present at the external terminals of smart battery 1 when battery 2 has reached the battery end-of-life threshold.

Oscillator stage 4 is used to clock the operations in DC-DC converter 6, in management unit 7 and in 1-wire interface 8. This oscillator stage 4 can preferably be formed of an oscillator connected to a clock quartz resonator 5 for supplying an oscillating signal at a frequency of around 32,768 Hz and series frequency dividers for dividing the oscillating signal frequency. The number of dividers-by-two may, for example, be equal to 15 to enable the oscillating signal frequency to be divided so as to provide a clock signal at 1 Hz to clock the elements of electronic circuit 10.

It is also to be noted that oscillator stage 4 may be formed of an RC oscillator and frequency dividers as mentioned above. This type of RC oscillator can be entirely integrated in the electronic integrated circuit, which is not the case of the quartz resonator. However, an RC oscillator supplies an oscillating signal with less precision than the oscillating signal generated by a quartz resonator oscillator.

The 1-wire interface 8 is directly connected to the management unit and is used for the transmission of information through one of the external terminals of smart battery 1. Preferably, the 1-wire interface is connected to the external positive terminal of smart battery 1 to allow the transmission of a modulated data or command signal 18 by a 1-wire bus to an electrical apparatus, which includes the smart battery. This 1-wire interface may be of the Dallas type and may be created as described in the AVR318 circuit by Atmel. The 1-wire Dallas interface protocol allows asynchronous two-way communication. In the modulated data or command signal, which is digital, one data bit is transmitted by the bus of 1-wire interface 8 per defined time window. To transmit a data bit at the "1" state, the interface draws a current or lowers the voltage for a first duration, whereas to transmit a data bit at the "0" state, the interface draws a current or lowers the voltage on the power supply for a second duration, which is greater than the first duration as explained in AVR318.

The 1-wire interface 8 which is controlled by management unit 7 clocked by the clock signal of oscillator stage 4, makes it possible to transmit a modulated data signal preferably through the external positive terminal of smart battery 1. The modulated data signal includes information as to the battery end-of-life, the type of battery, the remaining battery autonomy or any other type of information to be communicated to the electrical apparatus. The 1-wire interface may also transmit a modulated data signal, which is a top second signal, which represents a predefined code sent every second.

Of course, the 1-wire interface 8 can also receive a modulated data or command signal 18 from the electrical apparatus. The modulated signal received by 1-wire interface 8 may concern, for example, the setting of the battery end-of-life voltage threshold after which DC-DC converter 6 must be powered on, or another command or data. This battery end-of-life threshold received by 1-wire interface 8 must be stored for example in a non-volatile memory of management unit 7. Management unit 7 can adapt the battery end-of-life threshold of detector 3 by modifying the reference voltage or the capacitive divider. 1-wire interface 8 can also receive a modulated signal, particularly for calibrating oscillator stage 4 via management unit 7 provided with a processor, if the smart battery is placed in a watch.

It is to be noted that the electronic power supply voltage management circuit 10 can also be connected to a rechargeable battery 2 to define smart battery 1. In that case, a current gauge may also be provided to count the energy drawn from the battery, and the energy supplied to said battery.

Figure 2:
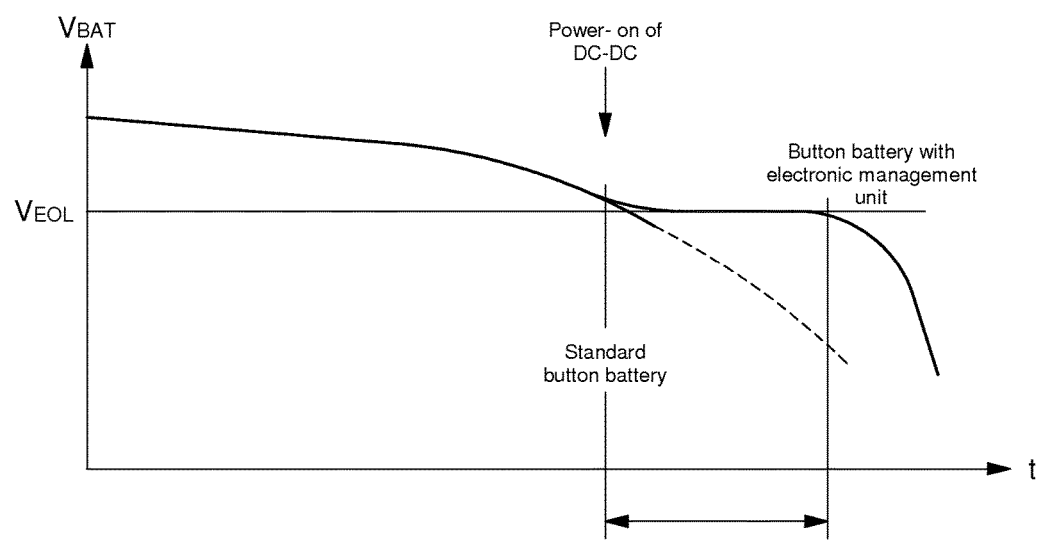
FIG. 2 shows a graph of the evolution of the power supply voltage supplied by the smart battery according to the invention compared to the evolution of the power supply voltage supplied by a conventional battery.

FIG. 2 shows a graph representing the evolution of the power supply voltage supplied by the smart battery according to the invention compared to the evolution of the power supply voltage supplied by a conventional battery. As soon as the battery voltage $V_{BAT}$ approaches the battery end-of-life voltage threshold $V_{EOL}$, the electronic management unit powers on the DC-DC converter. The energy taken from the smart battery is thus provided via the converter, which makes it possible to extend the life of the internal battery connected to the electronic circuit before changing the smart battery of the electrical apparatus containing said battery. Depending on the discharge of the smart battery, it is also possible to envisage limiting the maximum current supplied in order to further increase the life of said battery.

It is also to be noted that it is also possible to limit the energy impact of electronic power supply voltage management circuit 10 particularly on battery life. It may be possible to envisage introducing a powering on and off cycle, defining a cyclical ratio or duty cycle, to allow measurement of the voltage of battery 2, particularly by detector 3, at longer or shorter intervals according to the state of the battery. Normally, at least management unit 7 and oscillator stage 4 can be continually powered on to switch detector 3 on and off in a determined cyclical ratio.

First long measurement intervals are provided at the start of battery use with a voltage $V_{BAT}$ well above the battery end-of-life limit. A second voltage threshold may be set in the electronic circuit to determine whether voltage $V_{BAT}$ is well above this second voltage threshold Second short measurement intervals are provided when voltage $V_{BAT}$ approaches the critical battery end-of-life threshold below the second threshold.

This type of cycle may be controlled internally with only a small part of the electronic circuit operating as indicated above, and able to waken the other components of the circuit if necessary. This entails a power consumption of several tens of nano amperes. This type of cycle may also be controlled by the electronic circuity of the electrical apparatus or of the product which contains the smart battery.

From the description that has just been given, several variants of the smart battery provided with the electronic power supply voltage management circuit can be devised by those skilled in the art without departing from the scope of the invention defined by the claims. The battery end-of-life detector may include a resistive divider instead of a capacitive divider at the comparator input. The DC-DC converter may be a Buck and Boost converter. A change in clock signal frequency provided by the oscillator stage can be controlled via the management unit by selecting one of the outputs of each divider-by-two.

What is claimed is:

1. A smart battery comprising an electronic supply voltage management circuit connected to a battery, the electronic supply voltage management circuit including a battery end-of-life detector, a management unit, an oscillator stage, a DC-DC converter, and a data or command communication interface,
   wherein the battery is a button cell that includes a one wire interface as the data or command communication interface,
   wherein the smart battery includes supply voltage terminals,
   wherein the data or command communication interface is connected to one of the supply voltage terminals of the smart battery,
   wherein the data or command communication interface is configured to transmit and receive a modulated digital data or command signal through one of the supply voltage terminals,
   wherein the data or command communication interface is configured to receive a modulated signal from an electrical apparatus powered by the smart battery, the modulated signal received by the data or command communication interface including a command to set a battery end-of-life threshold after which the DC-DC converter is powered on by the management unit and supplies the supply voltage of the smart battery, and
   wherein the management unit is programmed to set the battery end-of-life threshold based on the modulated signal received by the data or command communication interface.

2. The smart battery according to claim 1, wherein the data or command communication interface is controlled by the management unit, which is connected to the battery end-of-life detector, and the data or command communication interface is configured to transmit a modulated signal including at least battery end-of-life information.

3. The smart battery according to claim 1, wherein the DC-DC converter is powered on when the supply voltage of the battery is close or equal to the battery end-of-life threshold, so that the DC-DC converter supplies the supply voltage of the smart battery.

4. The smart battery according to claim 3, wherein the management unit is connected to the battery end-of-life detector, to the oscillator stage, to the DC-DC converter and to the data or command communication interface, and the management unit is programmed to operate the DC-DC converter as soon as the battery end-of-life detector supplies an output signal to the management unit, and
   wherein the battery end-of life detector supplies the output signal to the management unit when the supply voltage of the battery is close or equal to the battery end-of-life threshold.

5. The smart battery according to claim 1, wherein the data or command communication interface is connected to an external positive supply voltage terminal of the smart battery for the transmission of the modulated signal.

6. The smart battery according to claim 5, wherein a positive terminal of the battery is connected to a first input of a switch of the electronic supply voltage management circuit, whereas a second input of the switch is connected to an output of the DC-DC converter that is configured to be powered on when the supply voltage of the battery is close or equal to the battery end-of-life threshold,
   wherein an output of the switch is connected to the external positive terminal of the smart battery, and
   wherein the switch is controlled by a command signal from the management unit, and the switch is configured to supply the voltage of the battery to the external positive terminal, if the battery voltage is above the battery end-of-life threshold, or to supply the output voltage of the DC-DC converter if the battery voltage is equal to or below the battery end-of-life threshold.

7. The smart battery according to claim 1, wherein the oscillator stage includes an oscillator connected to a quartz resonator for supplying an oscillating signal, and a series of dividers for dividing the oscillating signal frequency to supply a clock signal for clocking the operations of the management unit.

8. The smart battery according to claim 7, wherein the quartz resonator is a clock quartz resonator so that the oscillator supplies an oscillating signal at a frequency of around 32,768 Hz.

9. The smart battery according to claim 8, wherein the dividers are dividers-by-two, which are fifteen in number so as to divide the oscillating signal frequency to supply a clock signal at 1 Hz to allow data or command communication interface to transmit, every second, a modulated data signal, which is a top second signal.

10. The smart battery according to claim 1, wherein the management unit includes a non-volatile memory for storing the battery end-of-life voltage threshold, in order to adapt the battery end-of-life detector.

11. The smart battery according to claim 1, wherein the battery end-of-life detector is configured to be powered on and off at time intervals set in a cyclical ratio or duty cycle determined by the management unit clocked by the oscillator stage, and wherein the battery end-of-life detector is configured to measure the voltage level of the battery when the battery end-of-life detector is powered on.

12. The smart battery according to claim 11, wherein the battery end-of-life detector is configured to be powered on and off in first time intervals, if the voltage level of the battery is above a second voltage threshold higher than a first battery end-of-life threshold, and wherein the battery end-of-life detector is configured to be powered on and off in second time intervals that are shorter than the first time intervals, if the voltage level of the battery is below the second voltage threshold.

* * * * *